United States Patent
Pan

(10) Patent No.: US 10,517,151 B1
(45) Date of Patent: Dec. 24, 2019

(54) LINEAR CONSTANT-CURRENT LED LIGHT CIRCUIT

(71) Applicant: GUANGZHOU IETHAI LIGHTING ELECTRONIC TECHNOLOGY CO., LTD., Guangzhou (CN)

(72) Inventor: Weixiong Pan, Guangzhou (CN)

(73) Assignee: Guangzhou Iethai Lighting Electronic Technology Co., Ltd., Guangzhou (CN)

( * ) Notice: Subject to any disclaimer, the term of this patent is extended or adjusted under 35 U.S.C. 154(b) by 4 days.

(21) Appl. No.: 16/128,921

(22) Filed: Sep. 12, 2018

(30) Foreign Application Priority Data

Jun. 22, 2018 (CN) .......................... 2018 1 0651967

(51) Int. Cl.
*H05B 33/08* (2006.01)
*H05B 37/02* (2006.01)

(52) U.S. Cl.
CPC ..... *H05B 33/0812* (2013.01); *H05B 33/0845* (2013.01); *H05B 37/0272* (2013.01)

(58) Field of Classification Search
None
See application file for complete search history.

(56) References Cited

U.S. PATENT DOCUMENTS

| 2011/0001433 A1* | 1/2011 | Lee | H05B 33/0815 315/185 R |
| 2013/0026924 A1* | 1/2013 | Jong | H05B 33/0818 315/113 |

\* cited by examiner

*Primary Examiner* — Dedei K Hammond

(57) ABSTRACT

A linear constant-current LED light circuit that can automatically adapt to a change of an input voltage according to changes of a quantity of dedicated constant-current circuits and a quantity of LEDs in series, so that a total voltage of the LEDs is always close to the input voltage, thereby reducing a voltage drop of a constant-current transistor and reducing power loss of the constant-current transistor, so as to achieve energy saving. The dedicated constant-current circuits make the LEDs work in a rated current range, without generating overcurrent to cause damage, and a progressive decrease of a resistance of n stage dedicated constant-current circuits is set to implement a progressive increase of currents of the n stage dedicated constant-current circuits, so that a working current of the circuit can follow the input voltage. Therefore, the circuit has a relatively high power factor, relatively low harmonic distortion, and good electrical performance.

13 Claims, 6 Drawing Sheets

LINEAR CONSTANT-CURRENT LED LIGHT CIRCUIT

CROSS-REFERENCE TO RELATED APPLICATIONS

This application claims priority to Chinese application number 201810651967.4, filed Jun. 22, 2018, with a title of LINEAR CONSTANT-CURRENT LED LIGHT CIRCUIT. The above-mentioned patent application is incorporated herein by reference in its entirety.

BACKGROUND OF THE INVENTION

1. Field of Invention

The present invention relates to the field of LED control technologies, and in particular, to a linear constant-current LED light circuit.

2. Background of Related Art

At present, there are many LED (Light Emitting Diode, light emitting diode) lights using a linear constant-current scheme. In the linear constant-current scheme, a switch power supply is omitted, and an LED light has a longer service life and a simple structure, and can be integrated with LED light beads to be assembled into a light panel. The linear constant-current scheme is naturally compatible with a silicon-controlled light dimmer to implement silicon-controlled light dimming, but a light dimming effect is greatly affected by the silicon-controlled light dimmer. There are various silicon-controlled light dimmers on the market, and there are various light dimming manners, such as a forward mode and a backward mode. The silicon-controlled light dimmer cannot well coordinate with a linear constant-current LED generally, and a light dimming rate and the linearity are relatively low. Therefore, to achieve an ideal light dimming effect, external light dimming, such as WiFi light dimming and 0-10V light dimming, still need to be used. However, there is no unified interface standard for these external light dimming manners and linear constant-current LED lights. In a single-stage linear constant-current scheme, PWM (Pulse Width Modulation, Pulse Width Modulation) is usually used, optoelectronic isolation is performed and an analog quantity is obtained through conversion, to adjust a constant current, so as to implement light dimming. A circuit is relatively complex, and light dimming cannot be performed by using a constant-current integrated circuit scheme. For a multistage linear constant-current scheme that achieves relatively high performance, it is more difficult to implement external light dimming with good performance, and there is rarely a mature scheme. It can be learned that a general linear constant-current scheme used by an existing linear constant-current LED light, there are generally problems, such as poor performance, low efficiency, low luminous efficiency, low power factor, and high harmonics.

SUMMARY OF THE INVENTION

The present invention is to provide a linear constant-current LED light circuit, which features a simple circuit, a high power factor, low harmonics, high efficiency, and high luminous efficiency.

To achieve the above object, the present invention provides the following solution: A linear constant-current LED light circuit, including n dedicated constant-current circuits, where a $k^{th}$ dedicated constant-current circuit is provided with a first voltage input end Vka and a second voltage input end Vkb; the $k^{th}$ dedicated constant-current circuit includes a field effect transistor Tk, a triode Qk, a first resistor Rka, a second resistor Rkd, and an LED light LEDk; in the n dedicated constant-current circuits, a negative electrode of an LED light LED k−1 of a $(k-1)^{th}$ dedicated constant-current circuit is connected to the second voltage input end Vkb of the $k^{th}$ dedicated constant-current circuit; a first voltage input end V(k−1)a of the $(k-1)^{th}$ dedicated constant-current circuit is connected to the first voltage input end Vka of the $k^{th}$ dedicated constant-current circuit; a source of a field effect transistor Tk−1 of the $(k-1)^{th}$ dedicated constant-current circuit is connected to an emitter of the triode Qk of the $k^{th}$ dedicated constant-current circuit and the resistor Rkd; a resistance of a second resistor R(k−1)d of the $(k-1)^{th}$ dedicated constant-current circuit is greater than a resistance of the second resistor Rkd of the $k^{th}$ dedicated constant-current circuit, and $1 \leq k \leq n$.

In one embodiment, in the $k^{th}$ dedicated constant-current circuit, a positive electrode of the LED light LEDk is connected to the second voltage input end Vkb, and a negative electrode thereof is connected to a drain of the field effect transistor Tk; one end of the first resistor Rka is connected to the first voltage input end Vka, and the other end thereof is connected to a gate of the field effect transistor Tk; one end of the second resistor Rkd is connected to a source of the field effect transistor Tk, and the other end thereof is connected to an emitter of the triode Qk; a collector of the triode Qk is connected to the gate of the field effect transistor Tk; and a base of the triode Qk is connected to the source of the field effect transistor Tk.

In one embodiment, the $k^{th}$ dedicated constant-current circuit further includes a third voltage input end Vkd; and the base of the triode Qk is connected to the third voltage input end Vkd. In one embodiment, the linear constant-current LED light circuit further includes a rectifier bridge stack; and a first connecting end of the rectifier bridge stack is connected to an AC mains live-line connecting end; a second connecting end of the rectifier bridge stack is connected to a second voltage input end V1b of a first dedicated constant-current circuit in the n dedicated constant-current circuits; a third connecting end of the rectifier bridge stack is connected to an AC mains null-line connecting end; and a fourth connecting end of the rectifier bridge stack is connected to an emitter of a triode Q1 of the first dedicated constant-current circuit.

In one embodiment, the linear constant-current LED light circuit further includes a fuse and a varistor, where one end of the fuse is connected to the AC mains live-line connecting end, and the other end thereof is connected to the first connecting end of the rectifier bridge stack; and one end of the varistor is connected to the first connecting end of the rectifier bridge stack, and the other end thereof is connected to the third connecting end of the rectifier bridge stack.

In one embodiment, the $k^{th}$ dedicated constant-current circuit is further provided with a fourth voltage input end Vkc; and the $k^{th}$ dedicated constant-current circuit further includes a third resistor Rkb and a fourth resistor Rkc, where one end of the third resistor Rkb is connected to the base of the triode Qk, and the other end thereof is connected to the source of the field effect transistor Tk; and one end of the fourth resistor Rkc is connected to the base of the triode Qk, and the other end thereof is connected to the fourth voltage input end Vkc.

In one embodiment, in the n dedicated constant-current circuits, a fourth voltage input end V(k–1)c of the $(k-1)^{th}$ dedicated constant-current circuit is connected to the fourth voltage input end Vkc of the $k^{th}$ dedicated constant-current circuit. In one embodiment, the $k^{th}$ dedicated constant-current circuit further includes a capacitor Ck, a resistor R2k, a resistor R5k, and a resistor R6k, where one end of the capacitor Ck is connected to the gate of the field effect transistor Tk, and the other end thereof is connected to the base of the triode Qk; one end of the resistor R2k of the $k^{th}$ dedicated constant-current circuit is connected to the emitter of the triode Qk, and the other end thereof is connected to a source of a field effect transistor Tk of the $(k-1)^{th}$ dedicated constant-current circuit; one end of a resistor R21 of the first dedicated constant-current circuit is connected to the emitter of the triode Q1, and the other end thereof is connected to the fourth connecting end of the rectifier bridge stack; one end of the resistor R5k is connected to the base of the triode Qk through the fourth resistor Rkc, and the other end thereof is connected to the source of the field effect transistor Tk through the second resistor Rkd; one end of the resistor R6k is connected to the base of the triode Qk through the fourth resistor Rkc, and the other end thereof is used as an external voltage input end Uk; and an external voltage input end Uk–1 of the $(k-1)^{th}$ dedicated constant-current circuit is connected to the external voltage input end Uk of the $k^{th}$ dedicated constant-current circuit.

In one embodiment, the linear constant-current LED light circuit further includes a WiFi light dimming circuit, and the WiFi light dimming circuit is connected to external voltage input ends Uk of k dedicated constant-current circuits.

In one embodiment, the WiFi light dimming circuit includes a WiFi light dimmer, resistors Rb1 to Rb9, a photoelectric coupler, capacitors Cb1 to Cb5, a first operational amplifier, and a second operational amplifier, where a first connecting end of the photoelectric coupler is connected to a PWM signal output end of the WiFi light dimmer through the resistor Rb1; a second connecting end of the photoelectric coupler is grounded; the resistor Rb2 is connected in parallel between the first connecting end and the second connecting end of the photoelectric coupler; the capacitor Cb1 is connected in parallel between a third connecting end and a fourth connecting end of the photoelectric coupler; one end of the resistor Rb3 is connected to a fifth voltage input end and the other end thereof is connected to the fourth connecting end of the photoelectric coupler; one end of the resistor Rb8 is connected to the fourth connecting end of the photoelectric coupler, and the other end thereof is connected to a first input end of the first operational amplifier through the resistor Rb9; one end of the capacitor Cb3 is connected to the first input end of the first operational amplifier through the resistor Rb9, and the other end thereof is connected to a second input end of the first operational amplifier; one end of the capacitor Cb4 is connected to the first input end of the first operational amplifier, and the other end thereof is connected to the third connecting end of the photoelectric coupler; one end of the resistor Rb4 is connected to an output end of the first operational amplifier, and the other end thereof is connected to the third connecting end of the photoelectric coupler through the resistor Rb5; one end of the resistor Rb7 is connected to the resistor Rb4, and the other end thereof is connected to a first input end of the second operational amplifier; a second input end of the second operational amplifier is connected to the third connecting end of the photoelectric coupler through the resistor Rb5; one end of the resistor Rb6 is connected to the second input end of the second operational amplifier, and the other end thereof is connected to an output end of the second operational amplifier; one end of the capacitor Cb5 is connected to the output end of the second operational amplifier, and the other end thereof is grounded; and the output end of the second operational amplifier is connected to the external voltage input end Uk of the $k^{th}$ dedicated constant-current circuit.

According to specific embodiments provided in the present invention, the present invention discloses the following technical effects: The linear constant-current LED light circuit provided in the present invention can automatically adapt to a change of an input voltage according to changes of a quantity of dedicated constant-current circuits and a quantity of LEDs in series, so that a total voltage of the LEDs is always close to the input voltage, thereby reducing a voltage drop of a constant-current transistor and reducing a power loss of the constant-current transistor, so as to achieve energy saving; the dedicated constant-current circuit makes the LEDs work in a rated current range, without generating overcurrent to cause a damage; and a progressive decrease of a resistance of n stage dedicated constant-current circuits is set to implement a progressive increase of currents of the n stage dedicated constant-current circuits, so that a working current of the circuit can follow the input voltage. Therefore, the circuit has a relatively high power factor, relatively low harmonic distortion, and good electrical performance. In addition, by increasing the quantity of LEDs in series and the quantity of corresponding dedicated constant-current circuits, the efficiency and a power factor of the circuit can be further improved, and harmonic distortion can be reduced.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The present invention is to provide a linear constant-current LED light circuit, which features a simple circuit, a high power factor, low harmonics, high efficiency, and high luminous efficiency. To make the foregoing objective, features, and advantages of the present invention clearer and more comprehensible, the present invention is further described in detail below with reference to the accompanying drawings and specific embodiments.

Figure 1:
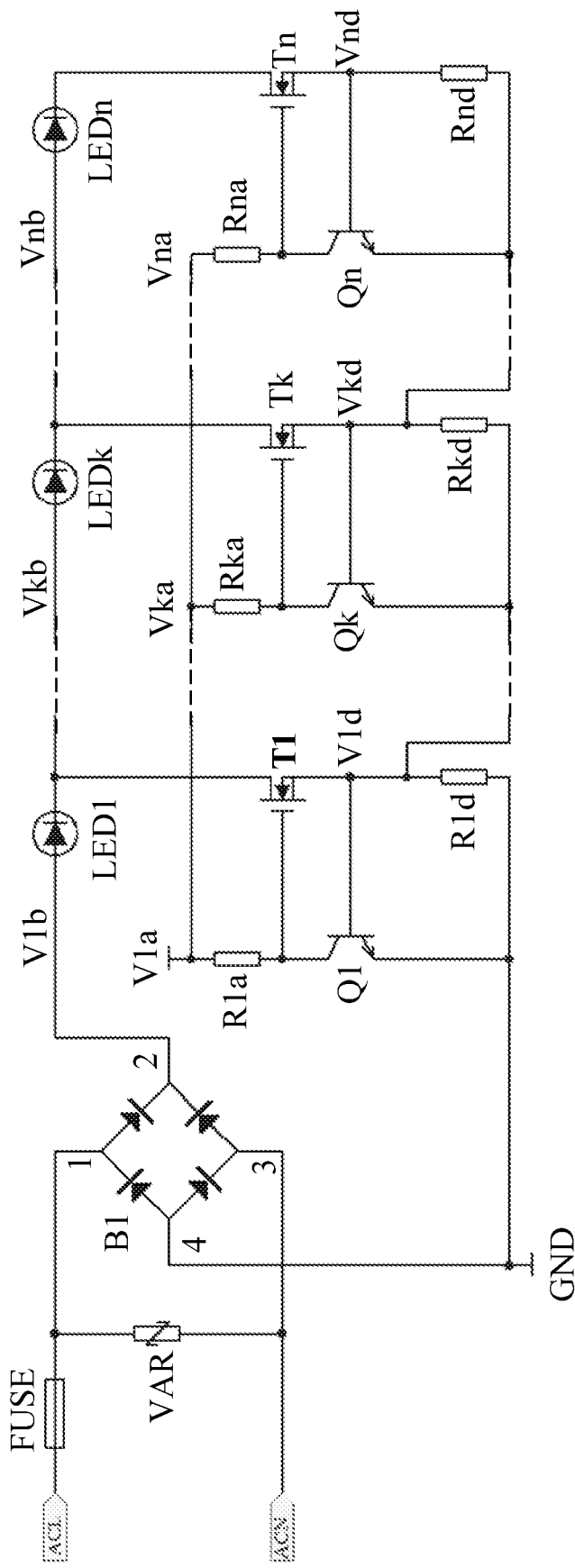
FIG. 1 is an overall schematic structural diagram of a linear constant-current LED light circuit according to the present invention.

FIG. 1 is an overall schematic structural diagram of a linear constant-current LED light circuit according to the present invention. Referring to FIG. 1, the linear constant-current LED light circuit provided in the present invention includes n dedicated constant-current circuits, where n≥1 and n is an integer. A $k^{th}$ dedicated constant-current circuit is provided with a first voltage input end Vka and a second voltage input end Vkb. The $k^{th}$ dedicated constant-current circuit includes a field effect transistor Tk, a triode Qk, a first resistor Rka, a second resistor Rkd, and an LED light LEDk. In the n dedicated constant-current circuits, a negative electrode of an LED light LEDk−1 of a $(k-1)^{th}$ dedicated constant-current circuit is connected to the second voltage input end Vkb of the $k^{th}$ dedicated constant-current circuit. A first voltage input end V(k−1)a of the $(k-1)^{th}$ dedicated constant-current circuit is connected to the first voltage input end Vka of the $k^{th}$ dedicated constant-current circuit. A source of a field effect transistor Tk−1 of the $(k-1)^{th}$ dedicated constant-current circuit is connected to an emitter of the triode Qk of the $k^{th}$ dedicated constant-current circuit. A resistance value of a second resistor R(k−1)d of the $(k-1)^{th}$ dedicated constant-current circuit is greater than a resistance value of the second resistor Rkd of the $k^{th}$ dedicated constant-current circuit. 1≤k≤n, and k is an integer.

In the $k^{th}$ dedicated constant-current circuit, a positive electrode of the LED light LEDk is connected to the second voltage input end Vkb, and a negative electrode thereof is connected to a drain of the field effect transistor Tk; one end of the first resistor Rka is connected to the first voltage input end Vka, and the other end thereof is connected to a gate of the field effect transistor Tk; one end of the second resistor Rkd is connected to a source of the field effect transistor Tk, and the other end thereof is connected to an emitter of the triode Qk; a collector of the triode Qk is connected to the gate of the field effect transistor Tk; and a base of the triode Qk is connected to the source of the field effect transistor Tk.

The $k^{th}$ dedicated constant-current circuit further includes a third voltage input end Vkd; and the base of the triode Qk is connected to the third voltage input end Vkd. The linear constant-current LED light circuit further includes a rectifier bridge stack B1. A first connecting end 1 of the rectifier bridge stack B1 is connected to an AC mains live-line connecting end; a second connecting end 2 of the rectifier bridge stack B1 is connected to a second voltage input end V1b of a first dedicated constant-current circuit in the n dedicated constant-current circuits; a third connecting end 3 of the rectifier bridge stack B1 is connected to an AC mains null-line connecting end ACN; and a fourth connecting end of the rectifier bridge stack B1 is connected to an emitter of a triode Q1 of the first dedicated constant-current circuit. Generally, the fourth connecting end of the rectifier bridge stack B1 is grounded.

In addition, the linear constant-current LED light circuit further includes a fuse FUSE and a varistor VAR. One end of the fuse FUSE is connected to the AC mains live-line connecting end ACL, and the other end thereof is connected to the first connecting end 1 of the rectifier bridge stack B1. One end of the varistor VAR is connected to the first connecting end 1 of the rectifier bridge stack B1, and the other end thereof is connected to the third connecting end 3 of the rectifier bridge stack B1.

The linear constant-current LED light circuit provided in the present invention can automatically adapt to a change of an input voltage according to a change of a quantity of dedicated constant-current circuits, so that a total voltage of LEDs is always close to the input voltage, thereby reducing a voltage drop of a constant-current transistor and reducing a power loss of the constant-current transistor, so as to achieve energy saving; the dedicated constant-current circuit makes the LEDs work in a rated current range, without generating overcurrent to cause a damage; and a progressive decrease of a resistance of n stage dedicated constant-current circuits is set to implement a progressive increase of currents of the n stage dedicated constant-current circuits, so that a working current of the circuit can follow the input voltage. Therefore, the circuit has a relatively high power factor, relatively low harmonic distortion, and good electrical performance.

Figure 2:
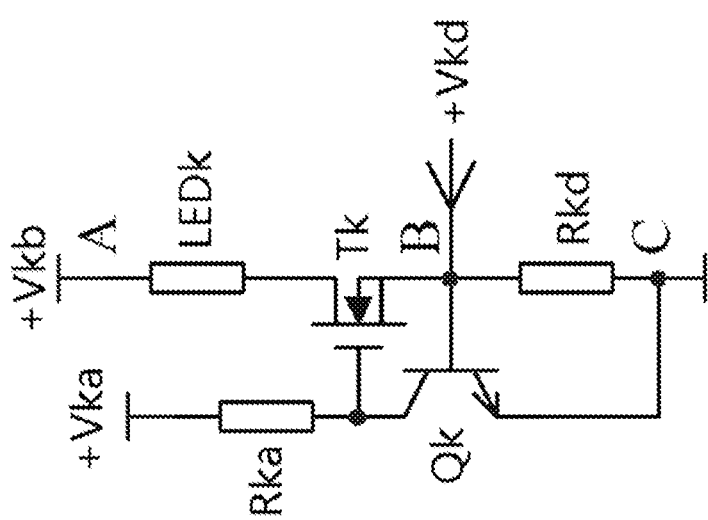
FIG. 2 is a schematic structural diagram of a $k^{th}$ dedicated constant-current circuit according to the present invention.

The following further describes in detail a principle and advantages of the present invention by using a $k^{th}$ dedicated constant-current circuit as an example. FIG. 2 is a schematic structural diagram of a $k^{th}$ dedicated constant-current circuit according to the present invention. Referring to FIG. 2, the dedicated constant-current circuit in the present invention includes a field effect transistor Tk, a triode Qk, a resistor Rka, a resistor Rkd, and load LEDk. A constant-current principle of the dedicated constant-current circuit is as follows: A current flowing through the load LEDk also flows through an MOS (metal oxide semiconductor) transistor Tk and the sampling resistor Rkd, a voltage drop of the sampling resistor Rkd is also a bias voltage of a base of the triode Qk, a collector of Qk is connected to a gate of Tk, Qk and Tk form a negative feedback circuit to stabilize a voltage drop of Rkd, to implement stabilization of the current of the load LEDk, so as to form a constant-current source circuit.

A working process of the dedicated constant-current circuit is as follows: When a voltage increases from a point A to a point C, the current of the load LEDk increases, the voltage drop of Rkd also increases, a working point of Qk increases, a voltage of the collector of Qk decreases, a bias voltage of Tk decreases, an internal resistance of Tk increases, and the current of the load LEDk decreases. According to the closed-loop feedback process, stabilization of the current of the load LEDk is implemented. Within a specific range, even a voltage of the point A changes, the current of LEDk can also keep stable. A constant current of the dedicated constant-current circuit is determined by a base voltage (approximately 0.6V) in a linear amplification area of the triode Qk and a resistance value of the sampling resistor Rkd. A relationship thereof is as follows: Constant current I=0.6/Rkd.

Both a voltage +Vka and a voltage +Vkb are external voltages. In an actual application, the voltage +Vka and the voltage +Vkb can be provided by a same voltage, and the voltage is related to the resistor Rka and the load LEDk. The resistor Rka is used for providing a bias voltage for the MOS transistor, and a value range of the resistor Rka may be quite large. A varistor VAR is disposed to protect the linear constant-current LED light circuit from being damaged by a surge voltage.

In addition, the dedicated constant-current circuit is also a controlled switch. When the external voltage +Vkd is not injected to a point B, a working state of a constant-current source of the circuit is not affected. When the external voltage +Vkd is injected to the point B, if an injection voltage is large enough and is greater than the base voltage (approximately 0.6V) in the linear amplification area of the triode Qk, because the injection current is large enough (greater than a specified constant current I of the sampling resistor Rkd, that is, greater than 0.6/Rkd), the voltage of the sampling resistor Rkd is large enough. Therefore, Qk deviates from the linear amplification area to be switched on completely or even reach saturated, and a voltage of the gate of Tk is driven down to a working point or below by Qk, so that Tk is cut off.

It can be learned that switch of the dedicated constant-current circuit between the constant current source and a switch can be controlled by controlling the injection voltage of the point B, so as to implement a function of the controlled switch.

In the following, the linear constant-current LED light circuit formed by three dedicated constant-current circuits is used as an example to describe a working principle and advantages of the linear constant-current LED light circuit in the present invention.

Figure 3:
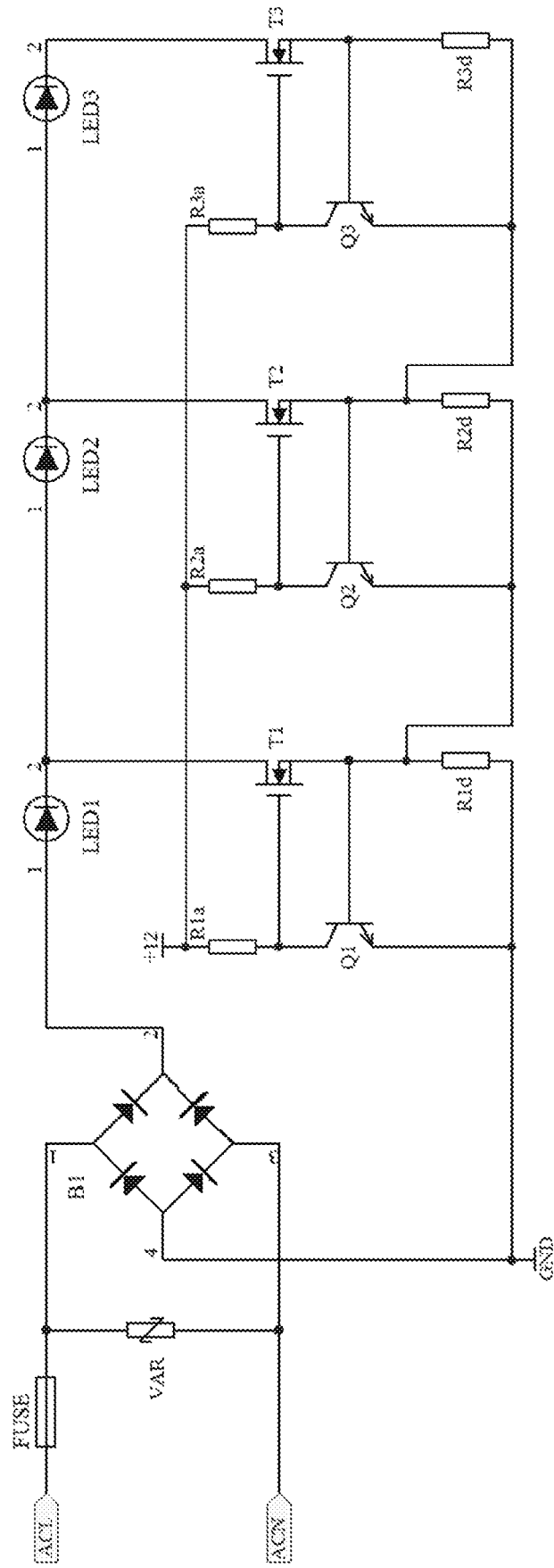
FIG. 3 is a schematic structural diagram of a specific implementation 1 of a linear constant-current LED light circuit according to the present invention.

FIG. 3 is a schematic structural diagram of a specific implementation 1 of a linear constant-current LED light circuit according to the present invention. Referring to FIG. 3, in a specific implementation, the linear constant-current LED light circuit includes three dedicated constant-current circuits, that is, n=3. A working principle of the linear constant-current LED light circuit is: A mains AC voltage becomes a fluctuating direct current after passing through a rectifier bridge stack B1, and changes repeatedly according to a positive half cycle of a sine wave. The voltage constantly increases from zero to a wave crest according to a sine rule, and then decreases from the wave crest to zero according to the sine rule, and that cycle repeats. Assuming that voltages of an LED1, an LED2, an LED3 are U1, U2, and U3, respectively, and that U1+U2+U3 is less than a mains voltage peak, by setting resistance values of R1$d$, R2$d$, and R3$d$ and letting R1$d$>R2$d$>R3$d$, a progressive increase of constant currents of T1, T2, and T3 in the dedicated constant-current circuit can be set, that is, the constant current of T3>the constant current of T2>the constant current of T1. When an input voltage changes periodically, a working process of the linear constant-current LED light circuit is as follows:

1. When the input voltage is greater than U1 and less than U1+U2, the constant-current source T1 works and the LED1 is switched on and glows.

2. When the input voltage is greater than U1+U2 and less than U1+U2+U3, the constant-current source T2 works, and both the LED1 and the LED2 are switched on and glow. Because a current of the constant-current source T2 is injected into a current sampling resistor of the constant-current source T1, and a working current of the constant-current source T2 is greater than that of the constant-current source T1, according to the foregoing controlled switch principle, T1 is cut off in this case, and no additional power loss is caused because no current flows through T1. In this case, the LED1 and the LED2 are connected in series, and an LED voltage increases as the input voltage increases.

3. When the voltage is greater than U1+U2+U3, and the constant-current source T3 works, the LED1, the LED2, and the LED3 are all switched on and glow. In accordance with the above principle, a current of the constant-current source T3 is injected into T2 and T1, and therefore T1 and T2 are cut off. The current only flows through the LED1, the LED2, the LED3, and T3, and no current flows through T2 and T1, and therefore, no additional power loss is caused. In this case, the LED1, the LED2, and the LED3 are connected in series, and the LED voltage further increases as the input voltage increases.

4. An input voltage decrease process is an inverse process of the foregoing process.

Similarly, one, two, four or more dedicated constant-current circuits all can form the foregoing linear constant-current LED light circuit according to a topology shown in FIG. 3. A working principle thereof is the same as that described above, and more LEDs in series and more corresponding dedicated constant-current source circuits lead to better circuit performance.

It can be learned that the dedicated constant-current circuit and the load LED can automatically adapt to a change of the input voltage according to a change of a quantity of dedicated constant-current circuits in series, so that a total voltage of the LEDs is always close to the input voltage, thereby reducing a voltage drop of a constant-current transistor and reducing a power loss of the constant-current transistor, so as to achieve energy saving; and the dedicated constant-current circuit makes the LEDs work in a rated current range, without generating overcurrent to cause a damage. In addition, a progressive increase of currents of n stage dedicated constant-current circuits is set, so that a working current of the circuit can follow the input voltage. Therefore, the linear constant-current LED light circuit in the present invention has a relatively high power factor and relatively low harmonic distortion, and good electrical performance. By increasing a quantity of LEDs in series and the quantity of corresponding dedicated constant-current circuits, the efficiency and a power factor of the circuit can be further improved, and harmonic distortion can be reduced.

Figure 4:
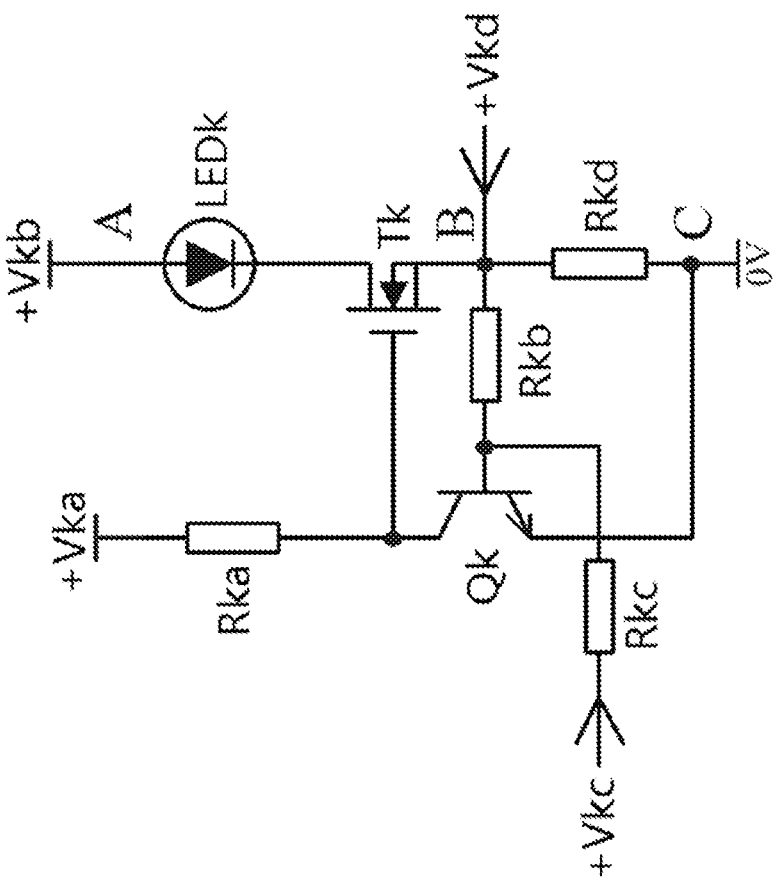
FIG. 4 is a schematic structural diagram of a dedicated constant-current light dimming circuit according to the present invention.

The present invention further provides a dedicated constant-current light dimming circuit and a linear constant-current light dimming LED light circuit formed by the dedicated constant-current light dimming circuit. FIG. 4 is a schematic structural diagram of a dedicated constant-current light dimming circuit according to the present invention. Referring to FIG. 4, a $k^{th}$ dedicated constant-current light dimming circuit is used as an example. Based on the dedicated constant-current circuit, the dedicated constant-current light dimming circuit provided in the present invention further includes a third resistor Rkb, a fourth resistor Rkc, and an external control voltage+Vkc. That is, the $k^{th}$ dedicated constant-current light dimming circuit is further provided with a fourth voltage input end Vkc, the third resistor Rkb, and the fourth resistor Rkc. One end of the third resistor Rkb is connected to the base of the triode Qk, and the other end thereof is connected to the source of the field effect transistor Tk. One end of the fourth resistor Rkc is connected to the base of the triode Qk, and the other end thereof is connected to the fourth voltage input end Vkc. A working current of an LED can be controlled by using the fourth voltage input end Vkc, so as to implement light dimming.

As shown in FIG. 4, the LED current is equal to a drain current of an MOS transistor Tk, is also equal to a source current, namely, a current of Rkd, and is approximately equal to Vkd/Rkd (a current flowing through Rkb is quite small and can be ignored relative to the current flowing through Rkd). Vkd is injected into the base of Qk by using Rkb, the collector of Qk is connected to a gate of the MOS transistor Tk to form a negative feedback circuit, so as to stabilize a working current of the load LEDk; and the external control voltage Vkc is also injected into the base of the triode Qk by using Rkc, Vkc is also be used to control a base current of the triode Qk, and a gate voltage of the MOS transistor Tk is controlled by using the triode Qk, so as to control the drain current of the MOS transistor Tk, that is, the working current of LEDk. It can be learned from the foregoing that the working current of LEDk is mainly determined by the resistance Rkd and the external voltage Vkc. After a resistance value of Rkd is selected, the working current of LEDk can be adjusted by controlling the external voltage Vkc, so as to implement light dimming. In addition, a sufficiently large current may be injected into the point B to make the MOS transistor Tk cut off, so as to implement a function of a controlled switch. Therefore, the circuit not only has a function of a constant-current light dimming circuit, but also has functions of the foregoing dedicated constant-current circuit and controlled switch.

In the n dedicated constant-current circuits, a fourth voltage input end $V(k-1)c$ of a $(k-1)^{th}$ dedicated constant-current circuit is connected to the fourth voltage input end Vkc of the $k^{th}$ dedicated constant-current circuit.

In the following, the linear constant-current light dimming LED light circuit formed by three dedicated constant-current light dimming circuits is used as an example to describe a working principle and advantages of the linear constant-current light dimming LED light circuit in the present invention.

Figure 5:
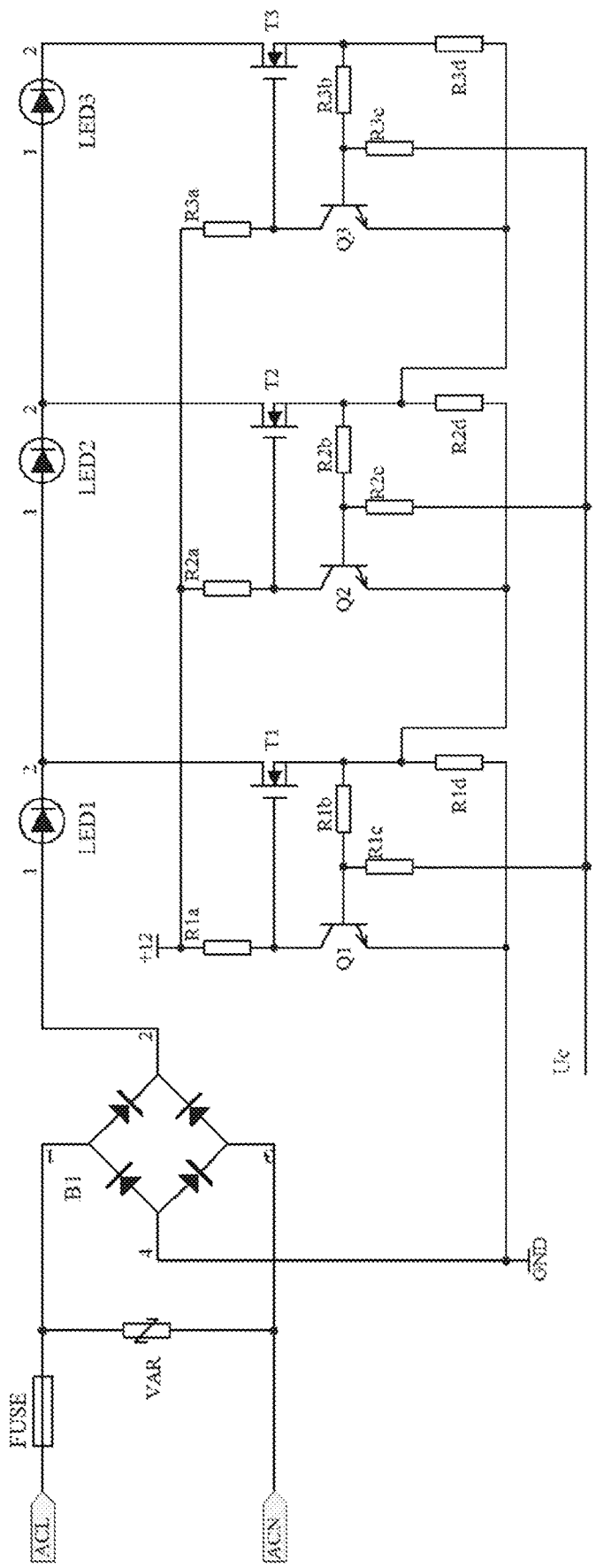
FIG. 5 is a schematic structural diagram of a specific implementation 2 of a linear constant-current LED light circuit according to the present invention.

FIG. 5 is a schematic structural diagram of a specific implementation 2 of a linear constant-current LED light circuit according to the present invention. Referring to FIG. 5, in a specific implementation, the linear constant-current LED light circuit provided in the present invention includes three dedicated constant-current light dimming circuits, that is, n=3.

A working principle of the linear constant-current light dimming LED light circuit is: The light dimming circuit uses three stage dedicated constant-current light dimming circuits, because a controlled constant-current circuit has a function of a dedicated constant-current circuit, the circuit has a function and advantages of the foregoing linear constant-current LED light circuit; due to use of the controlled constant-current circuit, light dimming can be implemented by adjusting an external control voltage Uc, so as to implement a function of the linear constant-current light dimming LED light. The circuit forms the linear constant-current light dimming LED light by using the controlled constant-current circuit, external light dimming of the linear constant-current LED light is implemented by using a relatively simple circuit, and a light dimming effect is good, so that an application range of the linear constant-current LED light is extended.

One, two, four or more controlled constant-current circuits all can form a linear constant-current light dimming LED light, a principle thereof is the same as that described above. More LEDs in series and more corresponding constant-current sources lead to better circuit performance.

In addition, the present invention further provides a dedicated constant-current wifi light dimming circuit and a linear constant-current WiFi light dimming LED light circuit formed by the dedicated constant-current WiFi light dimming circuit. Based on the dedicated linear constant-current light dimming circuit, the dedicated constant-current WiFi light dimming circuit further includes a capacitor Ck, a resistor R2k, a resistor R5k, and a resistor R6k. That is, the $k^{th}$ dedicated constant-current circuit further includes the capacitor Ck, the resistor R2k, the resistor R5k, and the resistor R6k. one end of the capacitor Ck is connected to the gate of the field effect transistor Tk, and the other end thereof is connected to the base of the triode Qk; one end of the resistor R2k of the $k^{th}$ dedicated constant-current circuit is connected to the emitter of the triode Qk, and the other end thereof is connected to a source of a field effect transistor Tk of the $(k-1)^{th}$ dedicated constant-current circuit; one end of a resistor R21 of the first dedicated constant-current circuit is connected to the emitter of the triode Q1, and the other end thereof is connected to the fourth connecting end of the rectifier bridge stack; one end of the resistor R5k is connected to the base of the triode Qk through the fourth resistor Rkc, and the other end thereof is connected to the source of the field effect transistor Tk through the second resistor Rkd; one end of the resistor R6k is connected to the base of the triode Qk through the fourth resistor Rkc, and the other end thereof is used as an external voltage input end Uk; and an external voltage input end Uk-1 of the $(k-1)^{th}$ dedicated constant-current circuit is connected to the external voltage input end Uk of the $k^{th}$ dedicated constant-current circuit.

The linear constant-current WiFi light dimming LED light circuit formed by the dedicated constant-current WiFi light dimming circuit further includes a WiFi light dimming circuit, and the WiFi light dimming circuit is connected to external voltage input ends Uk of k dedicated constant-current circuits.

The WiFi light dimming circuit specifically includes a WiFi light dimmer, resistors Rb1 to Rb9, a photoelectric coupler, capacitors Cb1 to Cb5, a first operational amplifier, and a second operational amplifier.

A first connecting end of the photoelectric coupler is connected to a PWM signal output end of the WiFi light dimmer through the resistor Rb1; a second connecting end of the photoelectric coupler is grounded; the resistor Rb2 is connected in parallel between the first connecting end and the second connecting end of the photoelectric coupler; the capacitor Cb1 is connected in parallel between a third connecting end and a fourth connecting end of the photoelectric coupler; one end of the resistor Rb3 is connected to a fifth voltage input end and the other end thereof is connected to the fourth connecting end of the photoelectric coupler; one end of the resistor Rb8 is connected to the fourth connecting end of the photoelectric coupler, and the other end thereof is connected to a first input end of the first operational amplifier through the resistor Rb9; one end of the capacitor Cb3 is connected to the first input end of the first operational amplifier through the resistor Rb9, and the other end thereof is connected to a second input end of the first operational amplifier; one end of the capacitor Cb4 is connected to the first input end of the first operational amplifier, and the other end thereof is connected to the third connecting end of the photoelectric coupler; one end of the resistor Rb4 is connected to an output end of the first operational amplifier, and the other end thereof is connected to the third connecting end of the photoelectric coupler through the resistor Rb5; one end of the resistor Rb7 is connected to the resistor Rb4, and the other end thereof is connected to a first input end of the second operational amplifier; a second input end of the second operational amplifier is connected to the third connecting end of the photoelectric coupler through the resistor Rb5; one end of the resistor Rb6 is connected to the second input end of the second operational amplifier, and the other end thereof is connected to an output end of the second operational amplifier; one end of the capacitor Cb5 is connected to the output end of the second operational amplifier, and the other end thereof is grounded; and the output end of the second operational amplifier is connected to the external voltage input end Uk of the $k^{th}$ dedicated constant-current circuit.

In the following, a linear constant-current light dimming LED light circuit formed by three dedicated constant-current WiFi light dimming circuit is used as an example to describe a working principle and advantages of the linear constant-current light dimming LED light circuit in the present invention.

Figure 6:
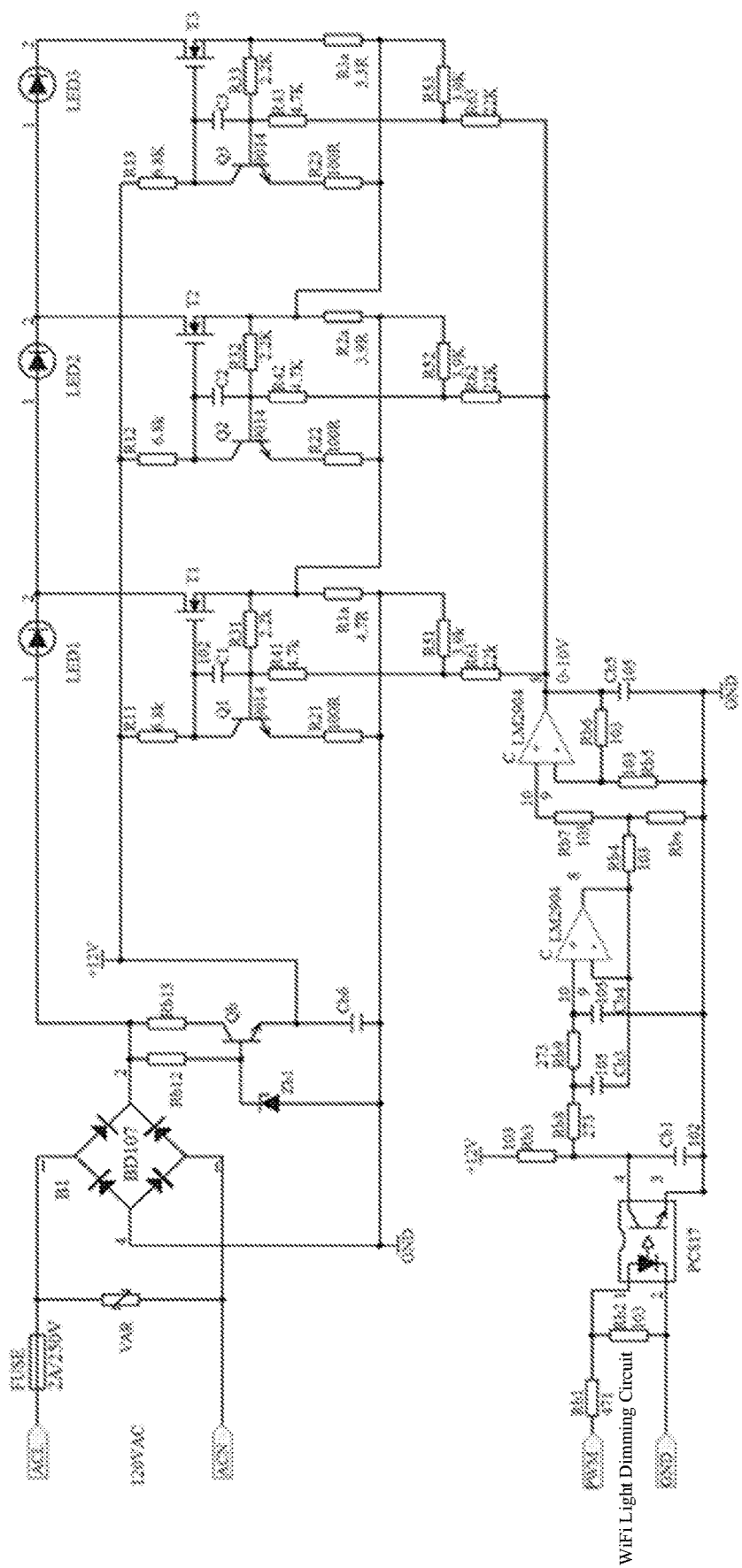
FIG. 6 is a schematic structural diagram of a specific implementation 3 of a linear constant-current LED light circuit according to the present invention.

FIG. 6 is a schematic structural diagram of a specific implementation 3 of a linear constant-current LED light circuit according to the present invention. Referring to FIG. 6, in a specific implementation, the linear constant-current light dimming LED light circuit includes three dedicated constant-current WiFi light dimming circuits, that is, n=3. In FIG. 6, the linear constant-current light dimming LED light circuit forms a linear constant-current LED light by using the dedicated constant-current WiFi light dimming circuits, and provides a control voltage for the dedicated constant-current WiFi light dimming circuits by using a WiFi light dimmer, an optical coupler, and a pulse width-voltage converter formed by an operational amplifier, so as to implement WiFi light dimming and forms a complete linear constant-current light dimming circuit.

It can be learned that the present invention creatively proposes a dedicated constant-current circuit, a linear constant-current LED light circuit formed by the dedicated constant-current circuit, a dedicated constant-current light dimming circuit, and a linear constant-current light dimming LED light circuit formed by the dedicated constant-current light dimming circuit. A constant current of the dedicated constant-current light dimming circuit is controlled by an external voltage. In addition, a linear constant-current light dimming LED light using the circuit design can implement an external light dimming manner, such as WiFi light dimming or 0-10V light dimming, and provides a novel solution to implement external light dimming such as WiFi light dimming and 0-10V light dimming for a linear constant-current LED light.

The linear constant-current LED light circuit provided in the present invention is formed by multiple stage dedicated constant-current circuits, has simple circuits, and does not require a complex switching power supply for power supply. For several LEDs, the dedicated constant-current circuits are used to change a quantity of LEDs in series to make a total voltage of the LEDs automatically adapt to a change of an input voltage and the LEDs work stably. A simple structure is used, so as to achieve advantages of a high power factor, low harmonics, and high luminous efficiency. Moreover, a control circuit and LED light beads can be integrated for installation, solving problems such as poor performance, low efficiency, low luminous efficiency, a low power factor, and high harmonics of an ordinary linear constant-current LED light. An LED light formed by using the circuit in the present invention also has good external WiFi light dimming and 0-10V light dimming effects. Smart light dimming of a mobile APP can be conveniently implemented through WiFi light dimming. Brightness, a color, and a spectrum of the linear constant-current LED light can be adjusted by using a mobile phone, and the linear constant-current LED light can be widely used in fields of home lighting, commercial lighting, and plant lighting.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In an actual design, a level isolation circuit needs to be disposed inside a chip, pins of the chip can be connected to MMOS transistors of different levels, and switch-on and switch-off of the MOS transistors can be controlled. Level isolation also needs to be performed on voltage and current detection points, to complete various detection functions as normal circuits. In addition, those skilled in the art can make various modifications in terms of specific embodiments and scope of application in accordance with the teachings of the present invention. In conclusion, the content of this specification shall not be construed as a limitation to the invention.

I claim:

1. A linear constant-current LED light circuit, comprising:
(n) dedicated constant-current circuits, wherein (n) is an integer and (n)≥1, and wherein a ($k^{th}$) dedicated constant-current circuit is provided with a first voltage input end (Vka) and a second voltage input end (Vkb);
the ($k^{th}$) dedicated constant-current circuit comprises a field effect transistor (Tk), a triode (Qk), a first resistor (Rka), a second resistor (Rkd), and an LED light (LEDk);
wherein in the (n) dedicated constant-current circuits, a negative electrode of an LED light (LED k−1) of a $(k-1)^{th}$ dedicated constant-current circuit is connected to the second voltage input end (Vkb) of the ($k^{th}$) dedicated constant-current circuit;
a first voltage input end (V(k−1)a) of the $(k-1)^{th}$ dedicated constant-current circuit is connected to the first voltage input end (Vka) of the ($k^{th}$) dedicated constant-current circuit;
a source of a field effect transistor (TK−1) of the $(k-1)^{th}$ dedicated constant-current circuit is connected to an emitter of the triode (Qk) of the $(k-1)^{th}$ dedicated constant-current circuit and the resistor (Rkd); and
a resistance of a second resistor (R(k−1)d) of the $(k-1)^{th}$ dedicated constant-current circuit is greater than a resistance of the second resistor (Rkd) of the ($k^{th}$) dedicated constant-current circuit, and 1≤(k)≤(n).

2. The linear constant-current LED light circuit according to claim 1, wherein in the ($k^{th}$) dedicated constant-current circuit, a positive electrode of the LED light (LEDk) is connected to the second voltage input end (Vkb), and a negative electrode thereof is connected to a drain of the field effect transistor (Tk);
one end of the first resistor (Rka) is connected to the first voltage input end (Vka), and the other end thereof is connected to a gate of the field effect transistor (Tk);
one end of the second resistor (Rkd) is connected to a source of the field effect transistor (Tk), and the other end thereof is connected to an emitter of the triode (Qk);
a collector of the triode (Qk) is connected to the gate of the field effect transistor (Tk); and
a base of the triode (Qk) is connected to the source of the field effect transistor (Tk).

3. The linear constant-current LED light circuit according to claim 2, wherein the ($k^{th}$) dedicated constant-current circuit further comprises a third voltage input end (Vkd); and the base of the triode (Qk) is connected to the third voltage input end (Vkd).

4. The linear constant-current LED light circuit according to claim 2, wherein the ($k^{th}$) dedicated constant-current circuit is further provided with a fourth voltage input end (Vkc); and the ($k^{th}$) dedicated constant-current circuit further comprises a third resistor (Rkb) and a fourth resistor (Rkc),
   wherein one end of the third resistor (Rkb) is connected to the base of the triode (Qk), and the other end thereof is connected to the source of the field effect transistor (Tk); and one end of the fourth resistor (Rkc) is connected to the base of the triode (Qk), and the other end thereof is connected to the fourth voltage input end (Vkc).

5. The linear constant-current LED light circuit according to claim 3, wherein the linear constant-current LED light circuit further comprises a rectifier bridge stack; and
   a first connecting end of the rectifier bridge stack is connected to an (AC) mains live-line connecting end; a second connecting end of the rectifier bridge stack is connected to a second voltage input end (V1b) of a first dedicated constant-current circuit in the (n) dedicated constant-current circuits; a third connecting end of the rectifier bridge stack is connected to an (AC) mains null-line connecting end; and a fourth connecting end of the rectifier bridge stack is connected to an emitter of a triode (Q1) of the first dedicated constant-current circuit.

6. The linear constant-current LED light circuit according to claim 3, wherein the ($k^{th}$) dedicated constant-current circuit is further provided with a fourth voltage input end (Vkc); and the ($k^{th}$) dedicated constant-current circuit further comprises a third resistor (Rkb) and a fourth resistor (Rkc),
   wherein one end of the third resistor (Rkb) is connected to the base of the triode (Qk), and the other end thereof is connected to the source of the field effect transistor (Tk); and one end of the fourth resistor (Rkc) is connected to the base of the triode (Qk), and the other end thereof is connected to the fourth voltage input end (Vkc).

7. The linear constant-current LED light circuit according to claim 5, wherein the linear constant-current LED light circuit further comprises a fuse and a varistor,
   wherein one end of the fuse is connected to the (AC) mains live-line connecting end, and the other end thereof is connected to the first connecting end of the rectifier bridge stack; and one end of the varistor is connected to the first connecting end of the rectifier bridge stack, and the other end thereof is connected to the third connecting end of the rectifier bridge stack.

8. The linear constant-current LED light circuit according to claim 5, wherein the ($k^{th}$) dedicated constant-current circuit is further provided with a fourth voltage input end (Vkc); and the ($k^{th}$) dedicated constant-current circuit further comprises a third resistor (Rkb) and a fourth resistor (Rkc),
   wherein one end of the third resistor (Rkb) is connected to the base of the triode (Qk), and the other end thereof is connected to the source of the field effect transistor (Tk); and one end of the fourth resistor (Rkc) is connected to the base of the triode (Qk) and the other end thereof is connected to the fourth voltage input end (Vkc).

9. The linear constant-current LED light circuit according to claim 7, wherein the ($k^{th}$) dedicated constant-current circuit is further provided with a fourth voltage input end (Vkc); and the ($k^{th}$) dedicated constant-current circuit further comprises a third resistor (Rkb) and a fourth resistor (Rkc),
   wherein one end of the third resistor (Rkb) is connected to the base of the triode (Qk), and the other end thereof is connected to the source of the field effect transistor (Tk); and one end of the fourth resistor (Rkc) is connected to the base of the triode (Qk), and the other end thereof is connected to the fourth voltage input end (Vkc).

10. The linear constant-current LED light circuit according to claim 9, wherein in the (n) dedicated constant-current circuits, a fourth voltage input end (V(k−1)c) of the $(k-1)^{th}$ dedicated constant-current circuit is connected to the fourth voltage input end (Vkc) of the ($k^{th}$) dedicated constant-current circuit.

11. The linear constant-current LED light circuit according to claim 10, wherein the ($k^{th}$) dedicated constant-current circuit further comprises a capacitor (Ck), a resistor (R2k), a resistor (R5k), and a resistor (R6k),
   wherein one end of the capacitor (Ck) is connected to the gate of the field effect transistor (Tk), and the other end thereof is connected to the base of the triode (Qk);
   wherein one end of the resistor (R2k) of the ($k^{th}$) dedicated constant-current circuit is connected to the emitter of the triode (Qk), and the other end thereof is connected to a source of a field effect transistor (Tk) of the $(k-1)^{th}$ dedicated constant-current circuit;
   wherein one end of a resistor (R21) of the first dedicated constant-current circuit is connected to the emitter of the triode (Q1), and the other end thereof is connected to the fourth connecting end of the rectifier bridge stack;
   wherein one end of the resistor (R5k) is connected to the base of the triode (Qk) through the fourth resistor (Rkc), and the other end thereof is connected to the source of the field effect transistor (Tk) through the second resistor (Rkd);
   wherein one end of the resistor (R6k) is connected to the base of the triode (Qk) through the fourth resistor (Rkc), and the other end thereof is used as an external voltage input end (Uk); and
   wherein an external voltage input end (Uk−1) of the $(k-1)^{th}$ dedicated constant-current circuit is connected to the external voltage input end (Uk) of the ($k^{th}$) dedicated constant-current circuit.

12. The linear constant-current LED light circuit according to claim 11, wherein the linear constant-current LED light circuit further comprises a WiFi light dimming circuit, and the WiFi light dimming circuit is connected to external voltage input ends (Uk) of (k) dedicated constant-current circuits.

13. The linear constant-current LED light circuit according to claim 12, wherein the WiFi light dimming circuit comprises a WiFi light dimmer, resistors (Rb1) to (Rb9), a photoelectric coupler, capacitors (Cb1) to (Cb5), a first operational amplifier, and a second operational amplifier,
   wherein a first connecting end of the photoelectric coupler is connected to a (PWM) signal output end of the WiFi light dimmer through the resistor (Rb1);
   wherein a second connecting end of the photoelectric coupler is grounded;
   wherein the resistor (Rb2) is connected in parallel between the first connecting end and the second connecting end of the photoelectric coupler;

wherein the capacitor (Cb1) is connected in parallel between a third connecting end and a fourth connecting end of the photoelectric coupler;

wherein one end of the resistor (Rb3) is connected to a fifth voltage input end and the other end thereof is connected to the fourth connecting end of the photoelectric coupler;

wherein one end of the resistor (Rb8) is connected to the fourth connecting end of the photoelectric coupler, and the other end thereof is connected to a first input end of the first operational amplifier through the resistor (Rb9);

wherein one end of the capacitor (Cb3) is connected to the first input end of the first operational amplifier through the resistor (Rb9), and the other end thereof is connected to a second input end of the first operational amplifier;

wherein one end of the capacitor (Cb4) is connected to the first input end of the first operational amplifier, and the other end thereof is connected to the third connecting end of the photoelectric coupler;

wherein one end of the resistor (Rb4) is connected to an output end of the first operational amplifier, and the other end thereof is connected to the third connecting end of the photoelectric coupler through the resistor (Rb5);

wherein one end of the resistor (Rb7) is connected to the resistor (Rb4), and the other end thereof is connected to a first input end of the second operational amplifier;

wherein a second input end of the second operational amplifier is connected to the third connecting end of the photoelectric coupler through the resistor (Rb5);

wherein one end of the resistor (Rb6) is connected to the second input end of the second operational amplifier, and the other end thereof is connected to an output end of the second operational amplifier;

wherein one end of the capacitor (Cb5) is connected to the output end of the second operational amplifier, and the other end thereof is grounded; and wherein the output end of the second operational amplifier is connected to the external voltage input end (Uk) of the ($k^{th}$) dedicated constant-current circuit.

* * * * *